United States Patent
Nylander et al.

(12)

(10) Patent No.: US 10,499,274 B2
(45) Date of Patent: Dec. 3, 2019

(54) ESTABLISHING AN INTERACTION SESSION BETWEEN A SERVICE CLIENT AND A RAN

(71) Applicant: Telefonaktiebolaget LM Ericsson (publ), Stockholm (SE)

(72) Inventors: Tomas Nylander, Värmdö (SE); Ann-Christine Eriksson, Enköping (SE); Jari Vikberg, Järna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 10 days.

(21) Appl. No.: 15/576,692

(22) PCT Filed: Jun. 17, 2015

(86) PCT No.: PCT/SE2015/050712
§ 371 (c)(1),
(2) Date: Nov. 22, 2017

(87) PCT Pub. No.: WO2016/204664
PCT Pub. Date: Dec. 22, 2016

(65) Prior Publication Data
US 2018/0139644 A1 May 17, 2018

(51) Int. Cl.
*H04W 28/02* (2009.01)
*H04L 29/08* (2006.01)
(Continued)

(52) U.S. Cl.
CPC ... *H04W 28/0268* (2013.01); *H04W 28/0263* (2013.01); *H04L 69/321* (2013.01); *H04W 80/02* (2013.01); *H04W 88/16* (2013.01)

(58) Field of Classification Search
None
See application file for complete search history.

(56) References Cited

U.S. PATENT DOCUMENTS

2013/0272181 A1* 10/2013 Fong .................. H04W 72/044
370/311
2014/0198637 A1* 7/2014 Shan .................. H04W 52/243
370/229

FOREIGN PATENT DOCUMENTS

EP  2779545 A1 * 9/2014 ........... H04L 47/803
EP  2779545 A1   9/2014

OTHER PUBLICATIONS

International Search Report and Written Opinion for Application No. PCT/SE2015/050712, dated Mar. 10, 2016, 10 pages.
(Continued)

*Primary Examiner* — Kouroush Mohebbi
(74) *Attorney, Agent, or Firm* — Patent Portfolio Builders, PLLC

(57) ABSTRACT

A method performed in a radio device comprising a service client configured for service level communication with a service provider via a Radio Access Network (RAN) to which the radio device is connected. The method is for establishing an interaction session between the service client and the RAN. The method comprises the service client packing first interaction data into a transparent first interaction container. The method also comprises transferring the first interaction container, comprising the first interaction data, from the service client to a control plane function in the radio device via an application programming interface (API). The method also comprises sending the first interaction container to the RAN by means of a radio control plane protocol of the control plane function over a radio interface.

17 Claims, 7 Drawing Sheets

(51) Int. Cl.
*H04W 80/02* (2009.01)
*H04W 88/16* (2009.01)

(56) References Cited

OTHER PUBLICATIONS

Office Action issued in application No. 15736868.9; dated Sep. 11, 2018; 05 pages.

* cited by examiner

| S1 Packing data | S1 Packing data | S11 Receiving 1st container | S11 Receiving 1st container |
|---|---|---|---|
| ↓ | ↓ | ↓ | ↓ |
| S2 Transferring 1st container | S2 Transferring 1st container | S12 Transferring 1st container | S12 Transferring 1st container |
| ↓ | ↓ | ↓ | ↓ |
| S3 Sending 1st container | S3 Sending 1st container | S13 Unpacking data | S13 Unpacking data |
| Fig. 11a | ↓ | Fig. 12a | ↓ |
| | S4 Receiving 2nd container | | S14 Packing data |
| | ↓ | | ↓ |
| | S5 Transferring 2nd container | | S15 Transferring 2nd container |
| | ↓ | | ↓ |
| | S6 Unpacking data | | S16 Sending 2nd container |
| | ↓ | | Fig. 12b |
| | S7 Controlling comm. | | |
| | Fig. 11b | | |

ESTABLISHING AN INTERACTION SESSION BETWEEN A SERVICE CLIENT AND A RAN

CROSS-REFERENCE TO RELATED APPLICATIONS

This application is a National stage of International Application No. PCT/SE2015/050712, filed Jun. 17, 2015, which is hereby incorporated by reference.

TECHNICAL FIELD

The present disclosure relates to methods and devices for control plane signalling in a radio communication network.

BACKGROUND

FIG. 1 is a simplified network illustration. The App x and App y in the User Equipment (UE) communicates with their respective server located on the Internet via the mobile operators Radio Access Network (RAN), Core Network (CN) and service network. To take the Adaptive Bit Rate feature as an example, for this feature the video server has the video encoded in different bitrates, and the UE selects the format based on throughput estimations. End user experience or Quality of Experience (QoE) is a differentiator for mobile operators and internet service providers. Applications are attempting to be adaptive to ensure a good QoE, e.g. by adapting to varying throughput by changing to an encoded format with a suitable bitrate. Currently this is done by trying to estimate the throughput between the server and the application in the UE, e.g. based on measured link bit rate or round trip times (RTT). How frequently the bitrate can be changed varies. A typical interval for adaptive video streaming would be every 2-5 seconds.

FIG. 2 is a schematic diagram of Evolved Packet Core (EPC) architecture (non-roaming) for access to a cellular network in accordance with a Third Generation Partnership Project (3GPP) standard. Evolved Packet System (EPS) is the Evolved 3GPP Packet Switched Domain and consists of EPC and an Evolved Universal Terrestrial Radio Access Network (E-UTRAN). The architecture is defined in 3GPP Technical Specification (TS) 23.401, which also defines the Packet Data Network (PDN) Gateway PGW, the Serving Gateway (SGW), the Policy and Charging Rules Function (PCRF), the Mobility Management Entity (MME) and the user equipment (UE, a radio device e.g. a mobile phone). The Long Term Evolution (LTE) radio access network, E-UTRAN, comprises one or more base stations called evolved Node B (eNB).

The overall E-UTRAN architecture and is further defined in for example 3GPP TS 36.300. The E-UTRAN comprises eNBs providing the E-UTRAN user plane (radio interface user plane layers such as Packet Data Convergence Protocol (PDCP), Radio Link Control (RLC), Media Access Control (MAC) and physical layer (PHY)) and control plane (Radio Resource Control, RRC, in addition to the above user plane protocol layers) protocol terminations towards the UE. The eNBs are interconnected with each other over the X2 interface. The eNBs are also connected by means of the S1 interface to the EPC, more specifically to the MME over the S1-MME interface and to the SGW over the S1-U interface.

A new RAN feature has been specified in 3GPP for LTE in Release 12 (Rel-12). It is called LTE Dual Connectivity (DC). As the name implies it means that a UE can be connected to multiple eNBs at the same time, i.e. send and receive data on multiple paths as illustrated in FIG. 3 (showing two different options for user plane handling of LTE DC). E-UTRAN supports DC operation whereby a UE comprising multiple receivers and transmitters (RX/TX) in RRC_CONNECTED state is configured to utilise radio resources provided by two distinct schedulers, located in two different eNBs connected via a non-ideal backhaul over the X2 interface.

In the DC solution, concepts of Master eNB (MeNB) and Secondary eNB (SeNB) are introduced. eNBs involved in dual connectivity for a certain UE may assume two different roles: an eNB may either act as an MeNB or as an SeNB. In dual connectivity, a UE is connected to one MeNB and one SeNB.

In DC, the radio protocol architecture that a particular bearer uses depends on how the bearer is setup. Three alternatives exist, Master Cell Group (MCG) bearer, Secondary Cell Group (SCG) bearer and split bearer.

For MCG bearers, the MeNB is user plane connected to the SGW via S1-U, the SeNB is not involved in the transport of user plane data.

For split bearers, the MeNB is user plane connected to the SGW via S1-U and in addition the MeNB and the SeNB are interconnected via X2. This is shown as the right hand side option of FIG. 3.

For SCG bearers, the SeNB is directly connected with the SGW via S1-U. This is shown as the left hand side option in FIG. 3.

In 3GPP, Quality of Service (QoS) is managed on a per bearer level from the CN. The RAN is responsible for setting up the radio bearers, radio resource management, and enforcing QoS according to the bearer QoS Profile—over the radio (e.g. LTE-Uu) interface in the downlink (DL) and over the transport network in the uplink (UL). The architectures differ slightly over the different radio access networks (e.g. 3G/Wideband Code Division Multiple Access (WCDMA) and 4G/LTE) but the QoS principles are similar (at least for 3G and 4G networks). FIG. 4 shows the EPS bearer architecture and the different levels of bearers building up the end-to-end connection for the UE.

3GPP defines the concept of a PDN. A PDN is in most cases an IP network, e.g. Internet or an operator IP Multimedia Subsystem (IMS) service network. A PDN has one or more names. Each name is defined in a string called Access Point Name (APN). The PGW is a gateway towards one or more PDNs. A UE may have one or more PDN connections. A PDN connection is a logical IP tunnel between UE and PGW, providing the UE access to a PDN. The setup of a PDN connection is initiated from the UE.

Every PDN connection consists of one or more EPS bearers. See 3GPP TS 23.401 section 4.7.2 for a description of the bearer concept. A bearer uniquely identifies traffic flows that receive a common QoS treatment between a UE and a PGW. Each bearer on a particular access has a unique bearer ID. On the 3GPP access, the bearer is end-to-end between UE and PGW. Every PDN connection has at least one bearer and this bearer is called the default bearer. All additional bearers on the PDN connection are called dedicated bearers.

A bearer carries traffic in the form of IP packets. Which traffic is carried on a bearer is defined by filters. A filter is an n-tuple where each element in the tuple contains a value, a range, or a wildcard. An n-tuple is also known as an IP flow.

An example of a 5-tuple is (dst IP=83.50.20.110, src IP=145.45.68.201, dst port=80, src port=*, prot=TCP). This 5-tuple defines a source (src) and destination (dst) IP address, a source and destination port, and a protocol.

The source port is a wildcard. Traffic matching this 5-tuple filter would be all Transmission Control Protocol (TCP) traffic from IP=145.45.68.201 to IP=83.50.20.110 and port=80.

A traffic flow template (TFT) contains one or more filters. Every bearer has a TFT. One bearer within a PDN connection and access may lack an explicit TFT (this bearer is typically the default bearer). Implicitly such a bearer has a TFT with a single filter matching all packets.

Bearers are used for example to provide different quality of service and characteristics. When a UE is active it has a default bearer where all traffic goes. The network or the UE can initiate a secondary/dedicated bearer with a different quality/characteristics. The network can detect a flow that should have a dedicated bearer by inspecting the traffic, or the network can be informed by an Application Function (AF), with reference to FIG. 2, an entity in the operators IP services, or the network can be informed by the UE about the need for a dedicated bearer. For example, if a video session is detected. The network then could trigger the establishment of a new bearer, apply a filter to separate which traffic should go on which bearer, i.e. the TFT. This TFT is also sent to the UE so that the UE can put UL traffic on the correct bearer. In DL, TFTs are used to map/select which transport tunnel (GTP tunnel) and bearer a certain flow should be sent on. A TFT can comprise the following identifiers:

Source Address and Subnet Mask
Protocol Number (IPv4)/Next Header (IPv6)
Destination Port Range
Source Port Range
IPsec SPI
TOS (IPv4)/Traffic Class (IPv6) and Mask
Flow Label (IPv6)

For example, the PGW will, when receiving an IP packet from Internet with destination IP address, select a UE context based on the destination IP address. This means that the UE context is identified with an UE IP address and contains a number of TFTs associated for each dedicated bearer established for the UE. The PGW then checks if there is a TFT associated with information included in the received IP packet in the UE context and try to match the received IP packet with the TFT, and if there is a match send the packet on the dedicated bearer associated with that TFT. Similarly for the UE, when an UL packet is sent from the higher layer parts of the UE, e.g. an app, and received by the lower layer of the UE, e.g. where the radio protocols reside, there is a check if there is a TFT that matches and if there is match then the UL packet is sent on the dedicated bearer associated with that TFT.

SUMMARY

The present disclosure is related to providing new functionality in existing (2G, 3G, 4G etc.) and future (5G, 6G, etc.) RAN and radio devices. The area of functionality comprises interactions between the service domain and RAN domain, for example between an app running on a radio device and a RAN node such as an eNB.

Service applications are attempting to be adaptive to ensure a good QoE, e.g. by adapting to varying throughputs by changing the bit rate or resolution of a streaming video and/or audio to avoid freezing of the play-out. Currently, this is done by trying to estimate the throughput between server and application in the radio device, e.g. based on measured link bit rate or round trip times (RTT). The estimation is typically performed by the application in the radio device, i.e. the service client (herein also called "client"). An interface between the mobile network and the client could be used to convey information that can be used to enhance service delivery and QoE.

It would be convenient to provide interaction between the service client in the radio device and the RAN based on user plane communication. However, if dedicated bearers are used to deliver the service in question, the interaction communication should preferably be possible to relate to the dedicated bearer of the service, since for example the achievable bitrate may depend on the priority of the bearer.

It may be possible to improve the throughput estimations by having network (NW) interaction with the clients, e.g. in accordance with the architecture illustrated in FIG. 5. A new functionality called an Interaction Gateway (IGW) is introduced in the network side for the communication towards (different parts of) a connected radio device. An I1-interface is introduced between the radio device and the Interaction Gateway. In addition, the Interaction Gateway may have another interface, called an I2-interface, towards the RAN depending on the position of the Interaction Gateway. The Interaction Gateway can be placed either in the RAN (see FIG. 5) or at the SGi interface. In the following, it is assumed that the IGW is in the RAN.

The I1-interface may be defined based on user plane traffic. It may for example be User Datagram Protocol (UDP)/Internet Protocol (IP)-based so that the client (app) in the radio device is able to send and receive interaction messages. The intention is that a single IP address may be used by the RAN nodes in one operators network for the interaction. This may simplify Operations and Maintenance (O&M) and RAN handling. The presence of this IP address (called RAN IP address, which may be part of default IGW address information) may thus be an indication of an interaction session message for the RAN. The client in the radio device can for example obtain this IP address by a Domain Name System (DNS) lookup. Additional measures may be needed since RAN does not normally terminate user plane traffic. Therefore, the RAN may perform "sniffing" of the uplink (UL) traffic to detect if a message is an interaction message or not (i.e. if the destination IP address=RAN IP address). When an interaction message is identified, it may only be forwarded to the Interaction Gateway (i.e. not towards the core network). When the Interaction Gateway in RAN wants to send an interaction message to the radio device, it is injected in the downlink traffic by the RAN. For the use case network assistance (which aims to improve QoE), the client in the radio device sends a query message to the RAN node asking for the available bitrate. This query is handled by the Interaction Gateway which interacts with a Function for Recommendation, wherein an achievable bit rate is estimated or predicted for the radio device. Then, a response message may be sent back to the radio device. The achievable bitrate may depend on a number of factors, e.g. number of radio devices in the cell that needs to share the capacity, the radio conditions of the radio device, and the priority for the bearer.

The user plane based interaction interface (I1) may have some issues if dedicated bearers are used and the UE-NW interactions are related to the session on the dedicated bearer. These issues are hereby exemplified:

a. In the case of a radio device having both a default bearer and a dedicated bearer involving one RAN node, then when an I1 query message is sent from the upper layer in the radio device, that query will be sent on the default bearer since the default bearer carries all IP-flows with no specific TFT filtering. The receiving RAN node cannot determine which bearer this query relates to and the subsequent bitrate recommendation will be done for the default bearer. If the query was related to the dedicated bearer, the recommendation will be incorrect.

b. In the case of Dual Connectivity, then an I1 query message sent by the radio device on the default bearer may result in that the query message even ends up in the wrong RAN node, e.g. if MCG bearer carries the default bearer, and SCG bearer carries the dedicated bearer.

c. Also, if I1 messages are sent on another bearer than the service they are related to, different priorities apply whereby there is a risk that for example I1 messages get a higher latency.

d. In case there are several bearers with services that requires I1 interaction, for example if two applications in the radio device wants to use I1 interaction for adaptive video, and they are on different bearers, then, the I1 interaction have to take place on the correct bearer.

It is an objective of the present disclosure to provide a RAN control plane based interaction interface or session between a radio device and a RAN arrangement, e.g. a RAN node or other part of the RAN, containing an interaction function such as the IGW discussed above.

According to an aspect of the present disclosure, there is provided a method performed in a radio device comprising a service client 82. The service client is configured for service level communication with a service provider via a RAN to which the radio device is connected. The method is for establishing an interaction session between the service client and the RAN. The method comprises the service client packing first interaction data into a transparent first interaction container. The method also comprises transferring the first interaction container, comprising the first interaction data, from the service client to a control plane function in the radio device via an application programming interface (API). The method also comprises sending the first interaction container to the RAN by means of a radio control plane protocol of the control plane function over a radio interface.

According to another aspect of the present disclosure, there is provided a radio device comprising a service client configured for service level communication with a service provider via a RAN to which the radio device is connected, processor circuitry, and storage storing instructions executable by said processor circuitry whereby said radio device is operative to pack, by means of the service client, first interaction data into a transparent first interaction container. The radio device is also operative to transfer the first interaction container, comprising the first interaction data, from the service client to a control plane function in the radio device via an API. The radio device is also operative to send the first interaction container to the RAN by means of a radio control plane protocol of the control plane function over a radio interface.

According to another aspect of the present disclosure, there is provided a method performed in a RAN comprising an interaction function configured for communication with a service client in a radio device connected to the RAN. The method is for establishing an interaction session between the interaction function and the service client. The method comprises receiving a first interaction container in accordance with a radio control plane protocol from the radio device over a radio interface. The method also comprises transferring the first interaction container from a control plane function in the RAN to the interaction function via an API. The method also comprises the interaction function unpacking first interaction data originating from the service client from the interaction container.

According to another aspect of the present disclosure, there is provided a RAN arrangement, or a RAN, comprising an interaction function configured for communication with a service client in a radio device connected to the RAN, processor circuitry, and storage storing instructions executable by said processor circuitry whereby said RAN arrangement is operative to receive a first interaction container in accordance with a radio control plane protocol from the radio device over a radio interface. The RAN arrangement is also operative to transfer the first interaction container from a control plane function in the RAN to the interaction function via an API. The RAN arrangement is also operative to unpack, by means of the interaction function, first interaction data originating from the service client from the interaction container.

According to another aspect of the present disclosure, there is provided a computer program product comprising computer-executable components for causing a radio device to perform an embodiment of a method of the present disclosure when the computer-executable components are run on processor circuitry comprised in the radio device.

According to another aspect of the present disclosure, there is provided a computer program product comprising computer-executable components for causing a RAN arrangement to perform an embodiment of a method of the present disclosure when the computer-executable components are run on processor circuitry comprised in the RAN arrangement.

According to another aspect of the present disclosure, there is provided a computer program for establishing an interaction session between a service client in a radio device and a RAN to which the radio device is connected. The service client is configured for service level communication with a service provider via the RAN. The computer program comprises computer program code which is able to, when run on processor circuitry of the radio device, cause the radio device to pack, by means of the service client, first interaction data into a transparent first interaction container. The code is also able to cause the radio device to transfer the first interaction container, comprising the first interaction data, from the service client to a control plane function in the radio device via an API. The code is also able to cause the radio device to send the first interaction container to the RAN by means of a radio control plane protocol of the control plane function over a radio interface.

According to another aspect of the present disclosure, there is provided a computer program for establishing an interaction session between an interaction function in a RAN and a service client in a radio device connected to the RAN. The computer program comprises computer program code which is able to, when run on processor circuitry of a RAN arrangement of the RAN, cause the RAN arrangement to receive a first interaction container in accordance with a radio control plane protocol from the radio device over a radio interface. The code is also able to cause the RAN arrangement to transfer the first interaction container from a control plane function in the RAN to the interaction function via an API. The code is also able to cause the RAN arrangement to unpack, by means of the interaction function, first interaction data originating from the service client from the interaction container.

According to another aspect of the present disclosure, there is provided a computer program product comprising an embodiment of a computer program of the present disclosure and a computer readable means on which the computer program is stored.

By using an interaction container and an API, data can in accordance with the present disclosure be sent between the service client in the radio device and the interaction function in the RAN over the control plane by means of a control plane protocol with the control plane function being agnostic of the data sent in the interaction container. Thus, an interaction session for direct communication between the service client and the RAN is enabled.

It is to be noted that any feature of any of the aspects may be applied to any other aspect, wherever appropriate. Likewise, any advantage of any of the aspects may apply to any of the other aspects. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second" etc. for different features/components of the present disclosure are only intended to distinguish the features/components from other similar features/components and not to impart any order or hierarchy to the features/components.

BRIEF DESCRIPTION OF THE DRAWINGS

Embodiments will be described, by way of example, with reference to the accompanying drawings, in which:

FIG. 11a is a schematic flow chart of an embodiment of a method performed in the radio device in accordance with the present disclosure.

FIG. 11b is a schematic flow chart of another embodiment of a method performed in the radio device in accordance with the present disclosure.

FIG. 12a is a schematic flow chart of an embodiment of a method performed in the RAN in accordance with the present disclosure.

FIG. 12b is a schematic flow chart of an embodiment of a method performed in the RAN in accordance with the present disclosure.

DETAILED DESCRIPTION

Embodiments will now be described more fully hereinafter with reference to the accompanying drawings, in which certain embodiments are shown. However, other embodiments in many different forms are possible within the scope of the present disclosure. Rather, the following embodiments are provided by way of example so that this disclosure will be thorough and complete, and will fully convey the scope of the disclosure to those skilled in the art. Like numbers refer to like elements throughout the description.

The present disclosure provides a RAN Control plane based interaction interface between the radio device and the RAN arrangement/node containing the interaction function. The disclosure is described using LTE Radio Resource Control (RRC) as an example and it is obvious for the one skilled in art that the methods and devices of the present disclosure may in applicable parts be applied for other 3GPP Radio Accesses (such as 2G, 3G, 5G, 6G etc.) and other radio control plane protocols (for example Packet Data Convergence Protocol, PDCP, Radio Link Control, RLC, or Media Access Control, MAC). In addition, the described principles may also be applied for any non-3GPP radio access (such as Wireless Local Area Network (WLAN)/Wi-Fi, Code Division Multiple Access (CDMA) etc.).

A principle of the RAN control plane based interaction interface is as follows.

1. RRC protocol is used to carry the interaction interface/session. A mechanism on RRC-level may be called "RRC Transparent Interaction Container" indicating that the RRC layer doesn't need to be aware of the actual data contents of the interaction session signalling.

2. On the network side, the RRC protocol layer termination may be connected to the interaction function/gateway, allowing the possibility to both send and receive interaction messages of the interaction session.

3. On the radio device side, an API may be provided from the RRC protocol layer towards the service client either directly or via the high level operating system.

Figure 1:
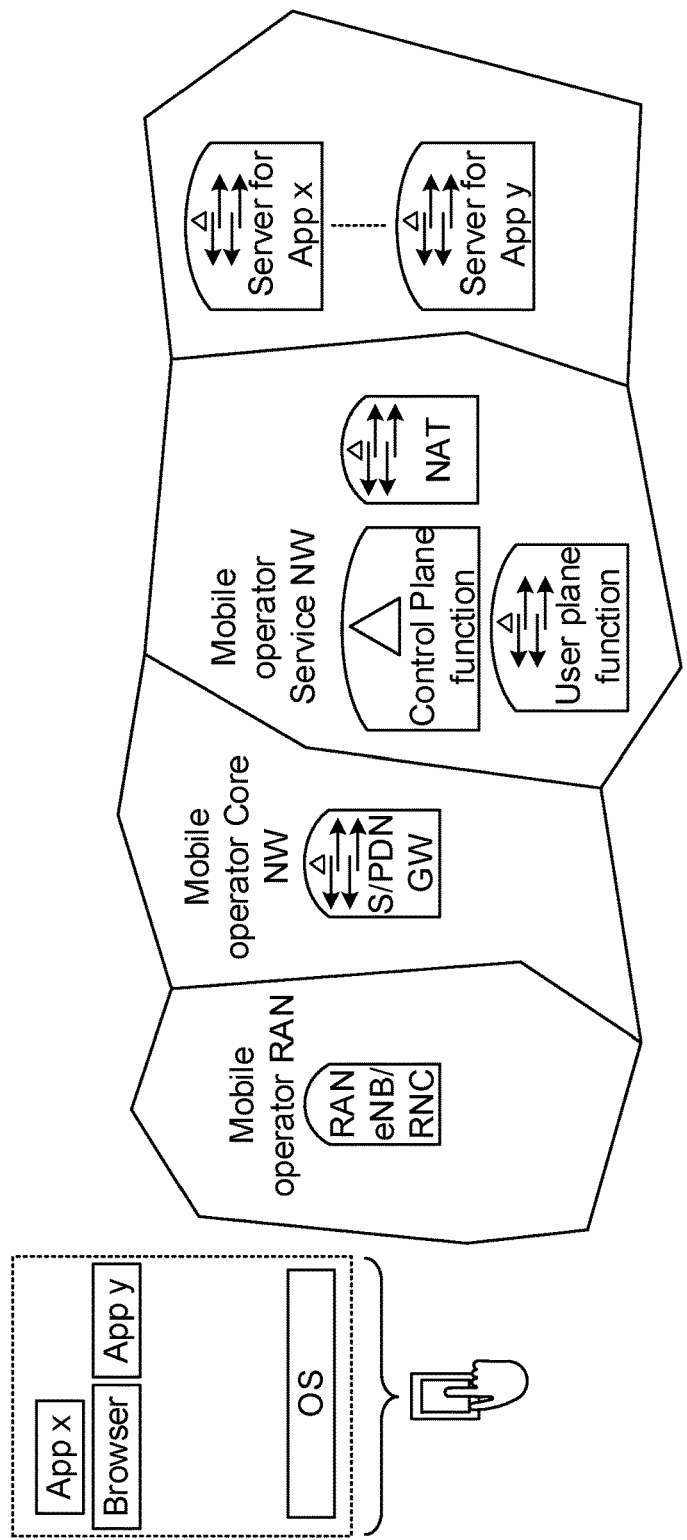
FIG. 1 is a schematic overview of a standard 3GPP communication network.
Figure 2:
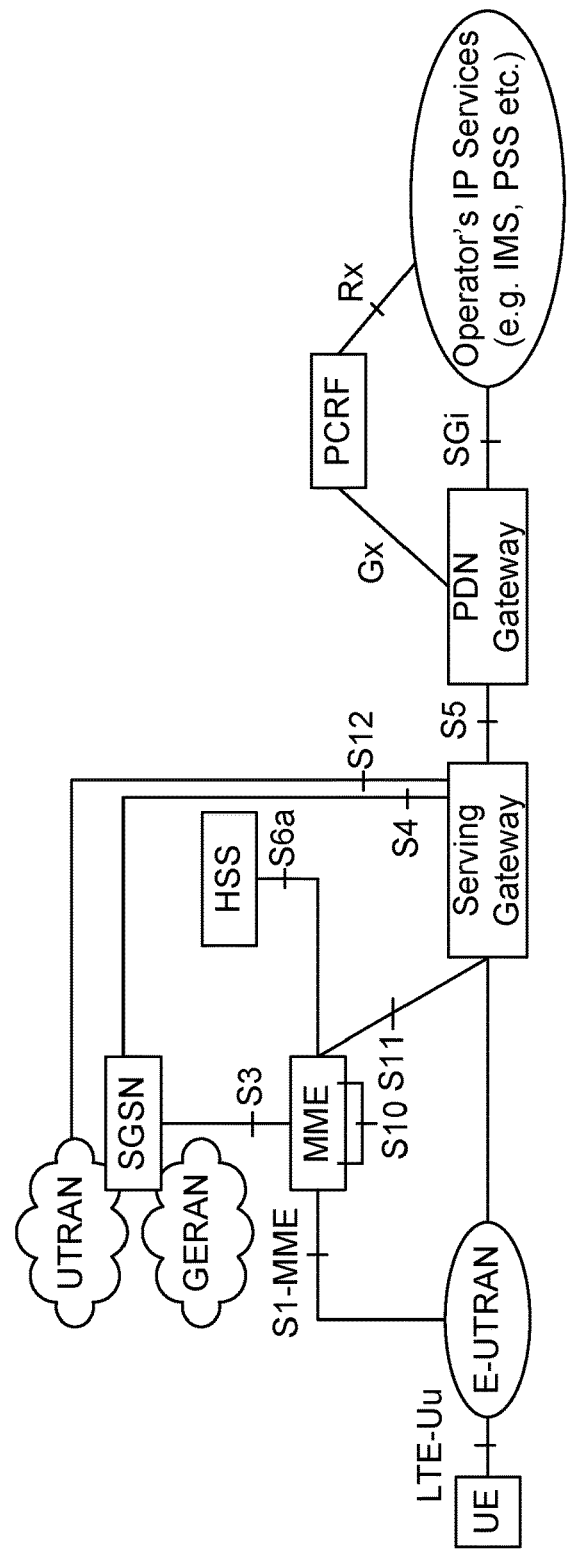
FIG. 2 is another, more detailed, schematic block diagram overview of a standard 3GPP communication network.
Figure 3:
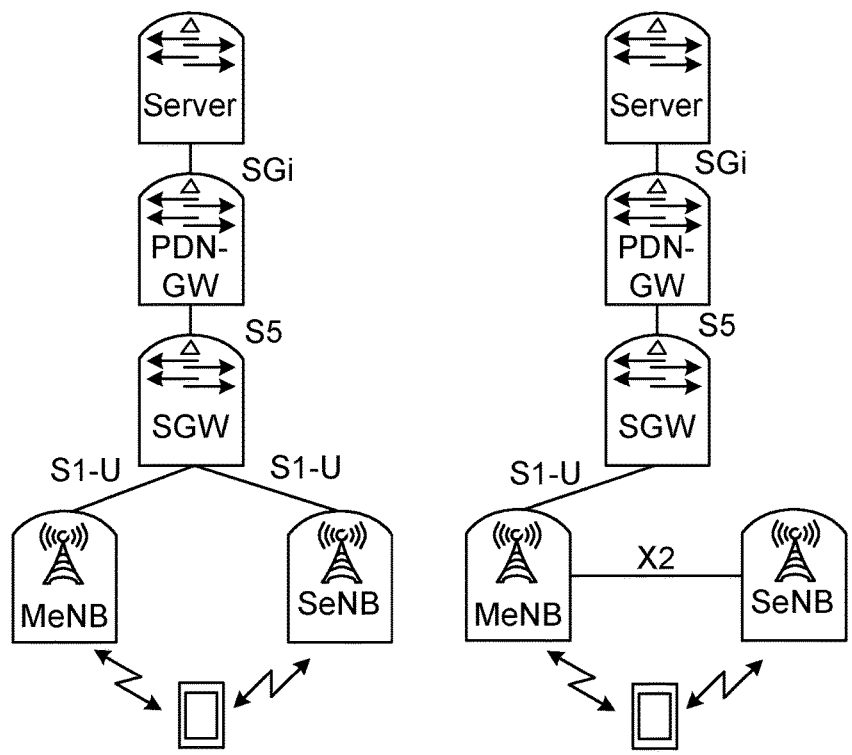
FIG. 3 is a schematic block diagram illustrating two different options for dual connectivity in accordance with LTE standard.
Figure 4:
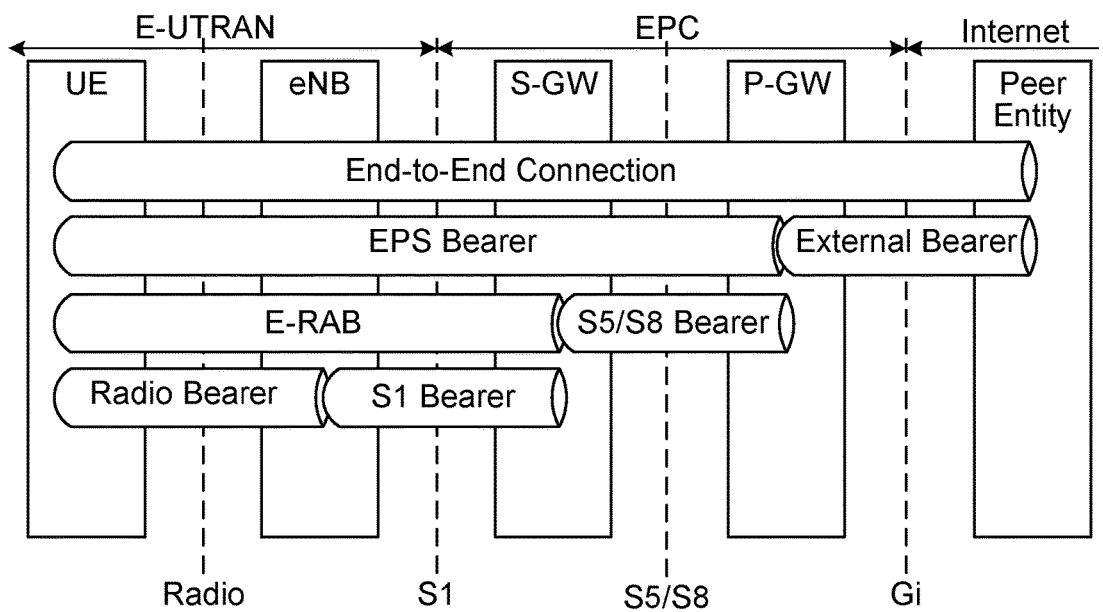
FIG. 4 is a schematic diagram illustrating the different bearer types in accordance with EPC.
Figure 5:
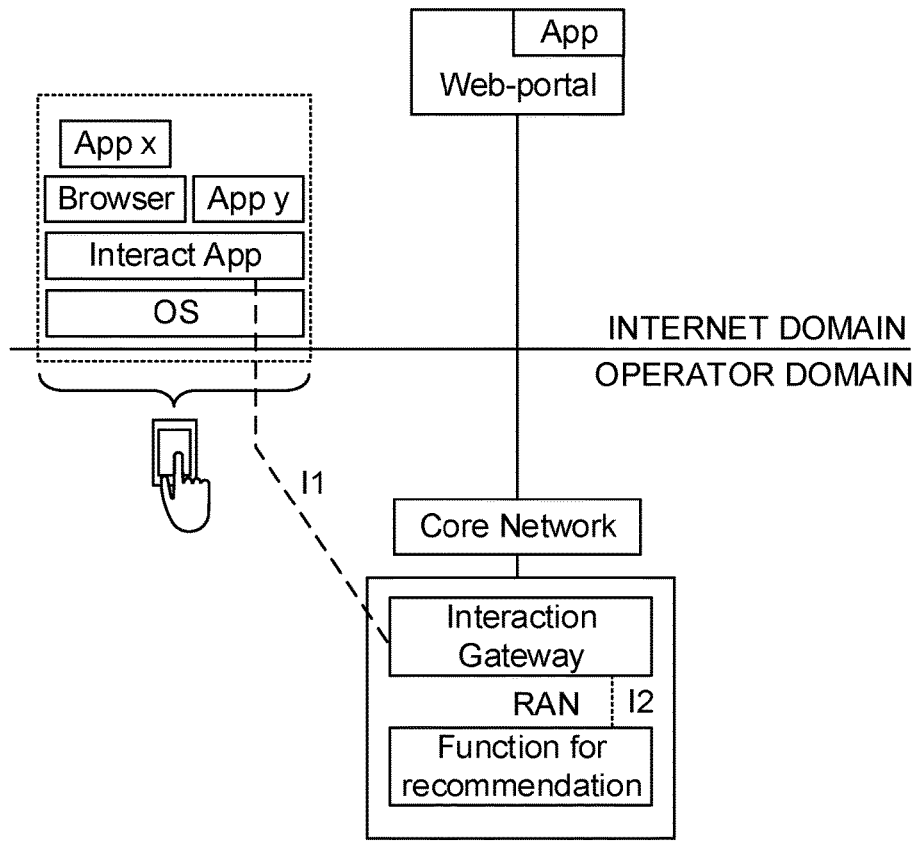
FIG. 5 is a schematic block diagram illustrating a positioning of an IGW as well as interfaces I1 and I2 to said IGW, in accordance with the present disclosure.
Figure 6:
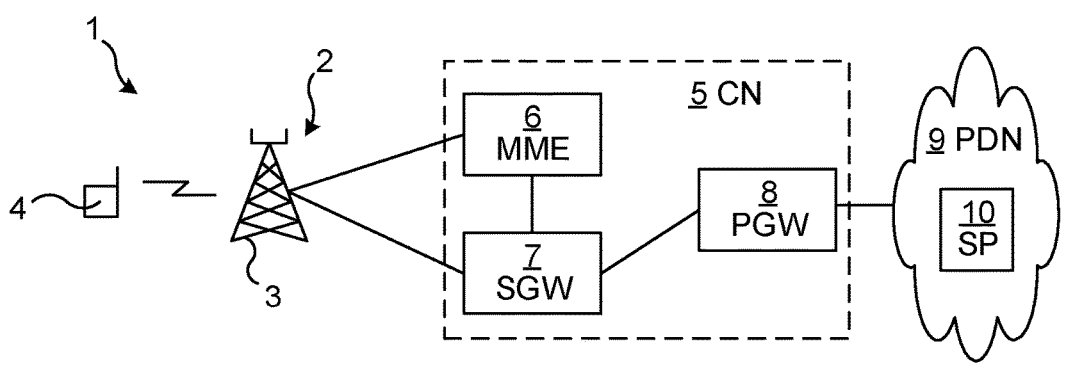
FIG. 6 is a schematic block diagram of an embodiment of a communication network in accordance with the present disclosure.

FIG. 6 is a schematic block diagram of a radio device 4 connected to a communication network 1. The communication network 1 comprises a RAN 2, e.g. a cellular RAN in accordance with a 3GPP standard, comprising one or a plurality of RAN arrangements 3 such as RAN nodes, e.g. evolved Node B (eNB) or Node B in combination with Radio Network Controller (RNC). The term "RAN arrangement" as used herein may refer to any part of the RAN 2. Often a RAN node is used as an example of the RAN arrangement. Thus, the discussions herein relating to a RAN node is therefor in applicable parts also relevant to any other type of RAN arrangement. The communication network 1 also comprises a CN 5 comprising an SGW 7 and a PGW 8 as well as an MME 6 and any other standard CN nodes needed. Via the PGW, the communication network is connected to the PDN 9, e.g. the Internet, in which a service provider (SP) 10 resides with one or a plurality of servers e.g. Content Delivery Network (CDN) servers.

The radio device 4 may be any device or user equipment (UE), mobile or stationary, enabled to communicate over a radio channel in a communication network 1, for instance but not limited to e.g. mobile phone, smart phone, modem, sensors, meters, vehicles (e.g. a car), household appliances, medical appliances, media players, cameras, or any type of consumer electronic, for instance but not limited to television, radio, lighting arrangements, tablet computer, laptop, or personal computer (PC).

Figures 7A, 7B:
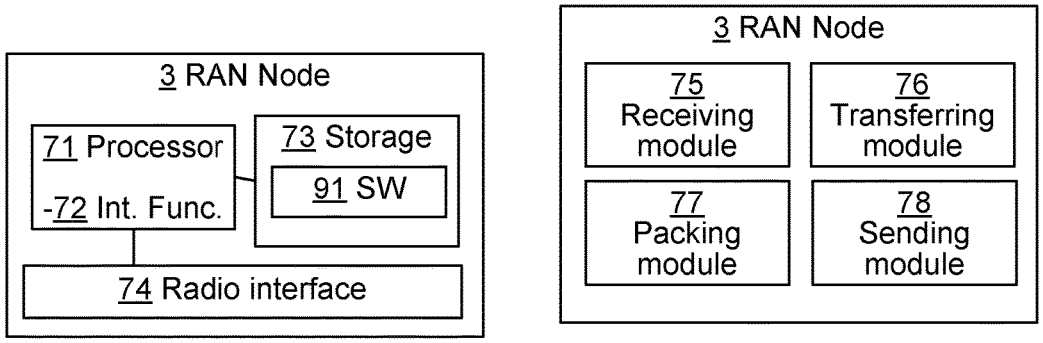
FIG. 7a is a schematic block diagram of an embodiment of a RAN node in accordance with the present disclosure.
FIG. 7b is a schematic block diagram of another embodiment of a RAN node in accordance with the present disclosure.

FIG. 7a schematically illustrates an embodiment of a RAN arrangement 3 (here in the form of a RAN node) of the present disclosure. The RAN node 3 comprises processor circuitry 71 e.g. a central processing unit (CPU). The processor circuitry 71 may comprise one or a plurality of processing units in the form of microprocessor(s). However, other suitable devices with computing capabilities could be comprised in the processor circuitry 71, e.g. an application specific integrated circuit (ASIC), a field programmable gate array (FPGA) or a complex programmable logic device (CPLD). The processor circuitry 71 is configured to run one or several computer program(s) or software (SW) 91 (see also FIG. 9) stored in a storage 73 of one or several storage unit(s) e.g. a memory. Thus, the interaction function, e.g. the IGW discussed above, may be formed in the processor circuitry 71 by SW 91 stored in the storage 73 running on the processor circuitry 71. The storage unit is regarded as a computer readable means 93 (see FIG. 9) as discussed herein and may e.g. be in the form of a Random Access Memory (RAM), a Flash memory or other solid state memory, or a hard disk, or be a combination thereof. The processor circuitry 71 may also be configured to store data in the storage 73, as needed. The RAN node 3 also comprises a radio interface 74 for communication with other nodes in the communication network 1 as well as with the radio device over a radio interface. The communication interface comprises a transmitter and a receiver, which may be combined into a transceiver, as well as an antenna for radio communication.

According to an aspect of the present disclosure, there is provided a RAN arrangement 3, of a RAN 2, comprising an interaction function 72 configured for communication with a service client 82 in a radio device 4 connected to the RAN 2, processor circuitry 71, and storage 73 storing instructions 91 executable by said processor circuitry whereby said RAN arrangement is operative to receive a first interaction container 100 in accordance with a radio control plane protocol from the radio device over a radio interface 74. The RAN arrangement is also operative to transfer the first interaction container from a control plane function in the RAN to the interaction function via an API 112. The RAN arrangement is also operative to unpack, by means of the interaction function, first interaction data originating from the service client from the interaction container.

FIG. 7b is a schematic block diagram functionally illustrating an embodiment of the RAN arrangement/node 3 in FIG. 7a. As previously mentioned, the processor circuitry 71 may run software 91 for enabling the RAN node 3 to perform an embodiment of a method of the present disclosure, whereby functional modules may be formed in RAN node 3 e.g. in the processor circuitry 71 for performing the different steps of the method. These modules are schematically illustrated as blocks within the RAN node 3.

According to an aspect of the present disclosure, there is provided a RAN arrangement 3 (e.g. in the form of a RAN node or other part of the RAN 2). The RAN arrangement comprises an interaction function 72 configured for communication with a service client 82 in a radio device 4, for establishing an interaction session between the interaction function and the service client. The RAN arrangement 3 comprises means (e.g. the receiving module 75) for receiving S11 a first interaction container 100 in accordance with a radio control plane protocol from the radio device over a radio interface 74. The RAN arrangement 3 also comprises means (e.g. the transferring module 76) for transferring S12 the first interaction container from a control plane function in the RAN to the interaction function 72 via an API 112. The RAN arrangement 3 also comprises means (e.g. the packing module 77) for the interaction function 72 unpacking S13 first interaction data originating from the service client 82 from the interaction container 100. In some embodiments of the present disclosure, the RAN arrangement 3 also comprises means (e.g. the packing module 77) for, in response to the unpacked S13 first interaction data, the interaction function 72 packing S14 second interaction data in a transparent second interaction container. The RAN arrangement 3 may also comprise means (e.g. the transferring module 76) for transferring S15 the second interaction container, comprising the packed S14 second interaction data, from the interaction function 72 to the control plane function via the API 112. The RAN arrangement 3 may also comprise means (e.g. the sending module 78) for sending S16 the second interaction container to the radio device 4 by means of a radio control plane protocol of the control plane function over a radio interface 74.

Figures 8A, 8B:
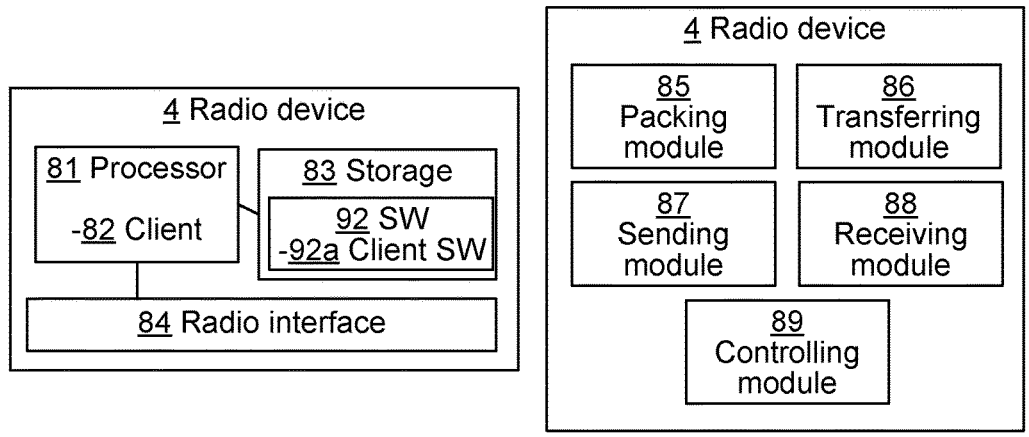
FIG. 8a is a schematic block diagram of an embodiment of a radio device in accordance with the present disclosure.
FIG. 8b is a schematic block diagram of another embodiment of a radio device in accordance with the present disclosure.

FIG. 8a schematically illustrates an embodiment of a radio device 4 of the present disclosure. The radio device 4 comprises processor circuitry 81 e.g. a central processing unit (CPU). The processor circuitry 81 may comprise one or a plurality of processing units in the form of microprocessor(s). However, other suitable devices with computing capabilities could be comprised in the processor circuitry 81, e.g. an application specific integrated circuit (ASIC), a field programmable gate array (FPGA) or a complex programmable logic device (CPLD). The processor circuitry 81 is configured to run one or several computer program(s) or software (SW) 92 (see also FIG. 9) stored in a storage 83 of one or several storage unit(s) e.g. a memory. Thus, the service client 82 (e.g. a service application, an app) may be formed in the processor circuitry 71 by client SW 92a stored in the storage 83 running on the processor circuitry 81. The storage unit is regarded as a computer readable means 93 (see FIG. 9) as discussed herein and may e.g. be in the form of a Random Access Memory (RAM), a Flash memory or other solid state memory, or a hard disk, or be a combination thereof. The processor circuitry 81 may also be configured to store data in the storage 83, as needed. The radio device 4 also comprises a radio interface 84 for communication with/via the communication network 1 e.g. via the RAN 2. The radio interface comprises a transmitter and a receiver, which may be combined into a transceiver, as well as an antenna for radio communication.

According to an aspect of the present disclosure, there is provided a radio device 4 comprising a service client 82 configured for service level communication with a service provider 10 via a RAN 2 to which the radio device is connected, processor circuitry 81, and storage 83 storing instructions 92 executable by said processor circuitry whereby said radio device is operative to pack, by means of the service client, first interaction data into a transparent first interaction container. The radio device is also operative to transfer the first interaction container, comprising the first interaction data, from the service client to a control plane function in the radio device via an API. The radio device is also operative to send the first interaction container to the RAN by means of a radio control plane protocol of the control plane function over a radio interface 84.

FIG. 8b is a schematic block diagram functionally illustrating an embodiment of the radio device 4 in FIG. 8a. As previously mentioned, the processor circuitry 81 may run software 92 for enabling the radio device 4 to perform an embodiment of a method of the present disclosure, whereby functional modules may be formed in the radio device 4 e.g. in the processor circuitry 81 for performing the different steps of the method. These modules are schematically illustrated as blocks within the radio device 4.

According to an aspect of the present disclosure, there is provided a radio device 4 comprising a service client 82 configured for service level communication with a service provider 10 via a RAN 2, for establishing an interaction session between the service client and the RAN. The radio device comprises means (e.g. the packing module 85) for the service client 82 packing S1 first interaction data into a transparent first interaction container 100. The radio device 4 also comprises means (e.g. the transferring module 86) for transferring S2 the first interaction container 100, comprising the first interaction data, from the service client 82 to a control plane function in the radio device via an API 102. The radio device 4 also comprises means (e.g. the sending module 87) for sending S3 the first interaction container to the RAN 2 by means of a radio control plane protocol of the control plane function over a radio interface 84. The radio device may in some embodiments also comprise means (e.g. the receiving module 88) for, in response to the sending S3 of the first interaction container 100, receiving S4, over the radio interface 84, a transparent second interaction container from the RAN 2. The radio device 4 may also comprise means (e.g. the transferring module 86) for transferring S5 the second interaction container from the control plane function to the service client 82 via the API 102. The radio device 4 may also comprise means (e.g. the packing module 85) for the service client unpacking S6 second interaction data from the second interaction container. The radio device may in some embodiments also comprise means (e.g. the controlling module 89) for controlling S7 the service level communication based on the second interaction data.

Figure 9:
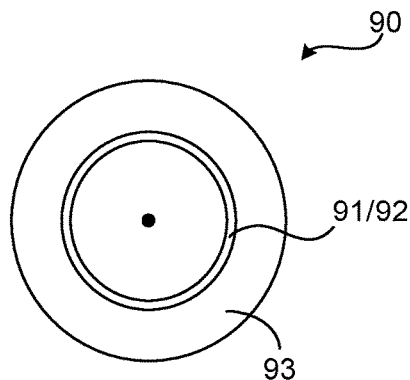
FIG. 9 is a schematic illustration of an embodiment of a computer program product in accordance with the present disclosure.

FIG. 9 illustrates a computer program product 90. The computer program product 90 comprises a computer readable (e.g. non-volatile and/or non-transitory) medium 93 comprising a computer program 91 and/or 92 in the form of computer-executable components 91/92. The computer program/computer-executable components 91/92 may be configured to cause a RAN arrangement 3 or a radio device 4, e.g. as discussed herein, to perform an embodiment of a method of the present disclosure. The computer program/computer-executable components may be run on the processor circuitry 71/81 of the RAN node 3/radio device 4 for causing it to perform the method. The computer program product 90 may e.g. be comprised in a storage unit or memory 73/83 comprised in the RAN node 3/radio device 4 and associated with the processor circuitry 71/81. Alternatively, the computer program product 90 may be, or be part of, a separate, e.g. mobile, storage means/medium, such as a computer readable disc, e.g. CD or DVD or hard disc/drive, or a solid state storage medium, e.g. a RAM or Flash memory. Further examples of the storage medium 93 can include, but are not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data. Embodiments of the present disclosure may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

According to an aspect of the present disclosure, there is provided a computer program product 90 comprising computer-executable components 91 for causing a RAN arrangement 3 or a radio device 2 to perform an embodiment of a method of the present disclosure when the computer-executable components are run on processor circuitry 71/81 comprised in the RAN arrangement/radio device.

According to another aspect of the present disclosure, there is provided a computer program 92 for establishing an interaction session between a service client 82 in a radio device 4 and a RAN 2 to which the radio device is connected. The service client is configured for service level communication with a service provider 10 via the RAN. The computer program comprises computer program code which is able to, when run on processor circuitry 81 of the radio device, cause the radio device to pack, by means of the service client, first interaction data into a transparent first interaction container. The code is also able to cause the radio device to transfer the first interaction container, comprising the first interaction data, from the service client to a control plane function in the radio device via an API. The code is also able to cause the radio device to send the first interaction container to the RAN by means of a radio control plane protocol of the control plane function over a radio interface.

According to another aspect of the present disclosure, there is provided a computer program 91 for establishing an interaction session between an interaction function 72 in a RAN 2 and a service client 82 in a radio device 4 connected to the RAN. The computer program comprises computer program code which is able to, when run on processor circuitry 71 of a RAN arrangement of the RAN, cause the RAN arrangement to receive a first interaction container in accordance with a radio control plane protocol from the radio device over a radio interface. The code is also able to cause the RAN arrangement to transfer the first interaction container from a control plane function in the RAN to the interaction function via an API. The code is also able to cause the RAN arrangement to unpack, by means of the interaction function, first interaction data originating from the service client from the interaction container.

According to another aspect of the present disclosure, there is provided a computer program product 90 comprising an embodiment of a computer program 91 or 92 of the present disclosure and a computer readable means 93 on which the computer program is stored.

Figure 10:
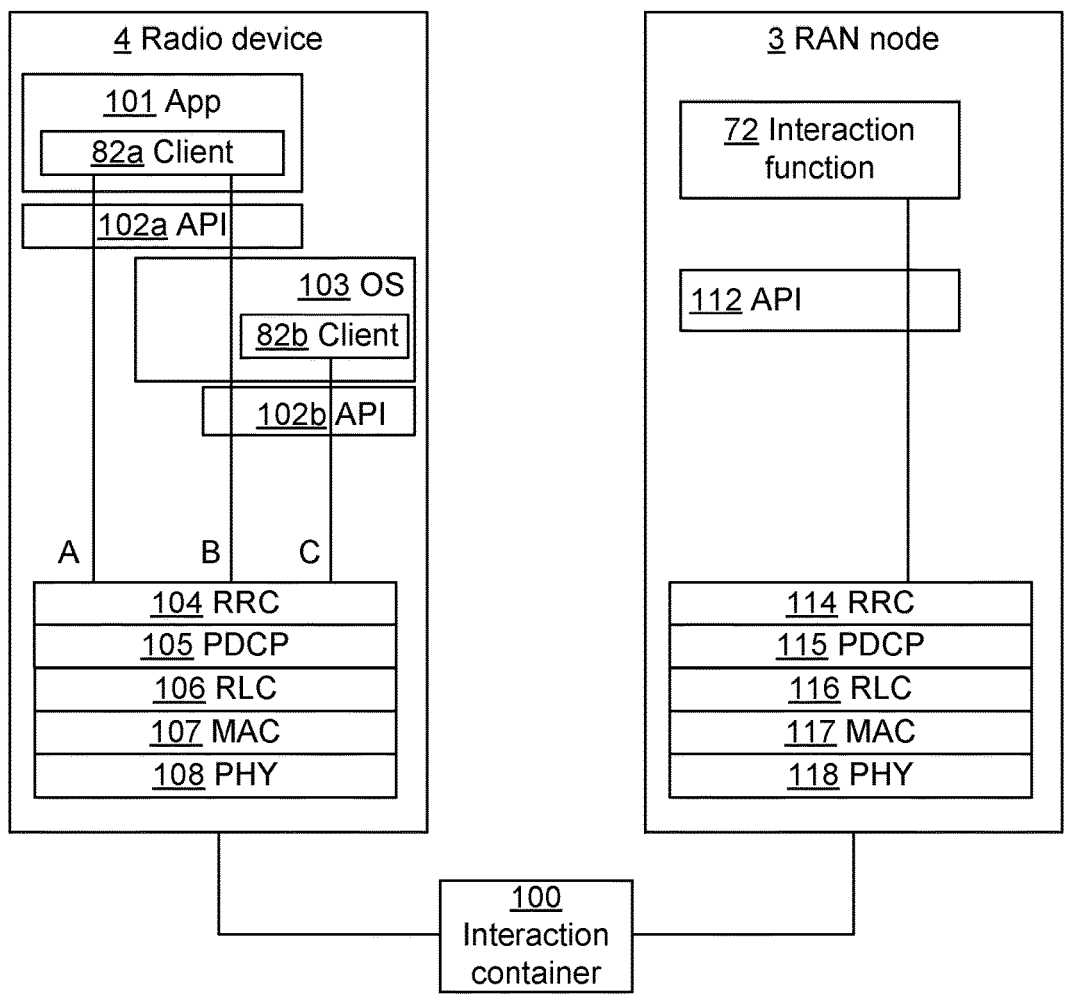
FIG. 10 is a schematic block diagram illustrating different signalling paths for the interaction session between the radio device and the RAN arrangement.

FIG. 10 is a schematic block diagram illustrating different signalling paths for the interaction session between the radio device 4 and the RAN arrangement 3. The figure shows some radio device aspects related to the transparent interaction container 100. The radio device 4 comprises at least three different layers, namely an applications layer comprising the app 101, a High Level Operating System (HLOS) layer comprising the operating system (OS) 103 and a chipsets layer (not explicitly shown) which in its turn is divided into a plurality of layers such as an RRC layer 104, a PDCP layer 105, an RLC layer 106, a MAC layer 107 and a physical layer 108.

In accordance with the present disclosure, API(s) 102 is/are used for the transparent interaction container and there are different paths with which such API(s) may be implemented depending on in which level the service client 82 is running in the radio device. Some of these different paths are as follows:

Path A: The service client 82a is in the app 101 and the path for the interaction container is from the App directly towards the RRC 104 (or other chipset layer) using (only) the API 102a.

Path B: The service client 82a is in the app 101 and the path for the interaction container is from the App towards the RRC 104 (or other chipset layer) via the OS 103 using both the API 102a and the API 102b.

Path C: The service client 82b is a function (e.g. a native media player) of the OS 103 and the path for the interaction container is from the OS client/function 82b directly towards the RRC 104 (or other chipset layer) using (only) the API 102b.

The API(s) 102 may comprise functionality such as:

a. Activation of the interaction interface (I1) for the interaction session.

b. Sending an interaction message towards the interaction function 72 in order to establish the interaction session.

c. Receiving a response to the interaction message from the interaction function 72 as an acknowledgement that the interaction session is established.

If the service client 82 is in an app 101, the app is capable of supporting the interaction session towards the RAN 2 using the transparent interaction container. The app 101 uses the API 102 to interact with e.g. the RRC layer 104 in the radio device to send and receive interaction signalling as part of the interaction session. Similarly, if the client 82 is in the OS 103, the OS supports the interaction session. The Interaction signalling may be passed using RRC over the LTE-Uu interface and on the RAN side the corresponding RRC layer 114 is connected to the interaction function 72 via a corresponding API 112 in the RAN arrangement 3. For the interaction session signalling, carrying the interaction container 100, standard or custom messages may be used, e.g. a standard RRC message such as an RRCConnectionRequest or an ULInformationTransfer. In the mean time, the client 82 may send and receive user plane data as part of the service level communication, independently of the control plane signalling of the interaction session.

By means of embodiments of the present disclosure, multiple benefits and advantages over user plane based solutions may be obtained. Some potential benefits include:

1. There may be no need for the RAN 2 to perform packet inspection ("sniffing") on uplink user plane for finding messages intended for the RAN 2 or the interaction function 72 therein.

2. There may be no need to pass the interaction messages of the interaction session between user and control plane handling parts of the RAN arrangement 3 since the messages may be sent directly to the interaction function 72 from the control plane part.

3. There may be no need to pass the interaction messages of the interaction session between different RAN nodes, e.g. between MeNB and SeNB in case of LTE DC.

4. The interaction interface (I1) may be terminated naturally very close to the normal control plane handling of the radio device in the RAN arrangement 3.

FIG. 11a is a schematic flow chart of an embodiment of the method performed in the radio device 4.

The service client 82 in the radio device 4 packs S1 first interaction data into a transparent first interaction container 100. The "packing" and "unpacking" discussed herein implies that the data is positioned inside a message which can be handled by the control plane while being agnostic of the data itself.

Then, the radio device transfers S2 the first interaction container 100, comprising the first interaction data, from the service client 82 to a control plane function in the radio device via an API 102 (e.g. API 102a and/or 102b).

Then, the radio device sends S3 the first interaction container to the RAN 2 by means of a radio control plane protocol of the control plane function over a radio interface 84.

FIG. 11b is a schematic flow chart of other embodiments of the method performed in the radio device 4. The packing S1, transferring S2 and sending S3 are as discussed in relation to FIG. 11a.

In some embodiments, the radio device 4 receives S4, over the radio interface 84 in response to the sending S3 of the first interaction container 100, a transparent second interaction container from the RAN 2.

Then, the radio device may transfer S5 the second interaction container from the control plane function to the service client 82 via the API 102, e.g. the same API as for the transferring S2 (e.g. API 102a and/or 102b).

Then, the service client 82 of the radio device may unpack S6 second interaction data from the second interaction container. Based on the second interaction data, the radio device may, in some embodiments, control S7 the service level communication between the service client 82 and the service provider 10.

FIG. 12a is a schematic flow chart of an embodiment of the method performed in the RAN 2. The method may be performed by a RAN arrangement 3 such as a RAN node e.g. in an RNC or in an eNB of the RAN 2.

The RAN 2 receives S11 a first interaction container 100 in accordance with a radio control plane protocol from the radio device 4 over a radio interface 74. The first interaction container may have been sent S3 by the radio device 4 in accordance with the discussion in relation to FIGS. 11a and 11b.

Then, the RAN transfers S12 the first interaction container from a control plane function in the RAN 2 to the interaction function 72 via an API 112. The API 112 may be any suitable interaction interface between the service plane layer, e.g. RRC layer 114 of the RAN arrangement 3 and the interaction function 72.

Then, the interaction function 72 in the RAN 2 unpacks S13 first interaction data originating from the service client 82 from the interaction container 100.

FIG. 12b is a schematic flow chart of other embodiments of the method performed in the RAN 2. The receiving S11, transferring S12 and unpacking S13 are as discussed in relation to FIG. 12a.

The interaction function 72 of the RAN may in response to the unpacked S13 first interaction data, pack S14 second interaction data in a transparent second interaction container.

Then, the RAN may transfer S15 the second interaction container, comprising the packed S14 second interaction data, from the interaction function 72 to the control plane function via the API 112, e.g. the same API as used for the transferring S12.

Then, the RAN 2 may send S16 the second interaction container to the radio device 4 by means of a radio control plane protocol of the control plane function over a radio interface 74. This may correspond to the radio device 4 receiving S4 the second container as discussed in relation to FIGS. 11a and 11b.

In some embodiments of the present disclosure, the first and/or second interaction data relates to the service level communication between the service client 82 and the service provider 10, e.g. to control of the service level communication. In some embodiments, the first and/or second interaction data relates to adaptive bitrate of the service level communication. The service may e.g. be streaming audio or video whereby the first and/or second interaction data may relate to controlling the bitrate of the audio or video stream. The service level communication may thus be for e.g. an adaptive video service.

In some embodiments of the present disclosure, the service level communication is over a dedicated bearer, e.g. an EPS bearer. In some embodiments, the control plane function (e.g. in any of the chipset layers 104-108) adds information about the dedicated bearer to the first interaction container 100. This information may e.g. identify the dedicated bearer such that the interaction function is informed about on which bearer the service level communication is and thus which bearer the first and/or second interaction data relates to. The control plane function may obtain this information e.g. from the service client 82 over the API 102. Thus, the information about the dedicated bearer may be based on service information from the service client 82 over the API 102. The information may e.g. be address information of the service level communication, e.g. an IP or other address to a server of the service provider 10 (whereby the RAN 2 may identify the bearer by observing on which bearer signalling using the address is), or an explicit identification by means of an identifier of the dedicated bearer. Thus, the service information comprises an address of the service provider (10) and/or an identifier of the dedicated bearer. Thereby, the interaction container may comprise bearer information.

In some embodiments of the present disclosure, the control plane function is comprised in an RRC 104, a PDCP 105, an RLC 106, or a MAC 107 layer of the radio device 4.

In some embodiments of the present disclosure, the service client 82 is comprised in a service application 101 in an application layer of the radio device 4, or the service client 82 is comprised in an operating system 103 of the radio device 4. In some embodiments, the service client 82 is comprised in the service application 101, and the API comprises a first API 102a between the service application and the operating system and a second API 102b between the operating system and the control plane function.

In some embodiments of the present disclosure, the first interaction container 100 comprises an identifier for the interaction function 72 in the RAN 2, which interaction function is in a protocol layer (e.g. RRC layer 114) corresponding to a protocol layer (e.g. RRC layer 104) of the radio device 4 in which the service client 82 is comprised.

In some embodiments of the present disclosure, the second interaction data is dependent on the first interaction data and/or on information about bandwidth available (e.g. information about cell load etc.) for the service level communication.

In some embodiments of the present disclosure, the first interaction container 100 comprises an identifier for the interaction function 72, for instructing the control plane function of the RAN 2 to perform the transferring S12 of the first interaction container.

The present disclosure has mainly been described above with reference to a few embodiments. However, as is readily appreciated by a person skilled in the art, other embodiments than the ones disclosed above are equally possible within the scope of the present disclosure, as defined by the appended claims.

The invention claimed is:

1. A method performed in a radio device comprising a service client configured for service level communication with a service provider via a Radio Access Network (RAN) to which the radio device is connected, for establishing an interaction session between the service client and the RAN, the method comprising:
   packing, by the service client, first interaction data into a first interaction container;
   transferring the first interaction container, comprising the first interaction data, from the service client to a control plane function in the radio device via an application programming interface (API); and
   sending the first interaction container to the RAN, by means of a radio control plane protocol of the control plane function, over a radio interface,
   wherein the service level communication between the service client and the service provider is over a dedicated bearer, and wherein the control plane function adds information about the dedicated bearer to the first interaction container.

2. The method of claim 1, wherein the first interaction data relates to control of the service level communication with the service provider.

3. The method of claim 2, wherein the service level communication is for an adaptive video service.

4. The method of claim 1, wherein the information about the dedicated bearer is based on service information from the service client over the API.

5. The method of claim 4, wherein the service information comprises at least one of an address of the service provider and an identifier of the dedicated bearer.

6. The method of claim 1, further comprising:
   in response to the sending of the first interaction container, receiving, over the radio interface, a second interaction container from the RAN;
   transferring the second interaction container from the control plane function to the service client via the API; and
   unpacking, by the service client, second interaction data from the second interaction container.

7. The method of claim 1, wherein the service client is comprised in a service application in an application layer of the radio device, or in an operating system of the radio device.

8. The method of claim 7, wherein the service client is comprised in the service application, and wherein the API comprises a first API between the service application and the operating system and a second API between the operating system and the control plane function.

9. A radio device having a service client configured for service level communication with a service provider via a Radio Access Network (RAN) to which the radio device is connected, the radio device comprising:
   processor circuitry; and
   storage storing instructions which, when executed by said processor circuitry, cause said radio device to perform operations to:
   pack, by means of the service client, first interaction data into a first interaction container;

transfer the first interaction container, comprising the first interaction data, from the service client to a control plane function in the radio device via an application programming interface (API); and send the first interaction container to the RAN, by means of a radio control plane protocol of the control plane function, over a radio interface, wherein the service level communication between the service client and the service provider is over a dedicated bearer, and wherein the instructions cause said radio device to add, by means of the control plane function, information about the dedicated bearer to the first interaction container.

10. A method performed in a Radio Access Network (RAN) comprising an interaction function configured for communication with a service client in a radio device connected to the RAN, for establishing an interaction session between the interaction function and the service client, the method comprising:

receiving a first interaction container, in accordance with a radio control plane protocol, from the radio device over a radio interface;

transferring the first interaction container from a control plane function in the RAN to the interaction function via an application programming interface (API), wherein the first interaction container comprises an identifier for the interaction function, instructing the control plane function to perform the transferring of the first interaction container to the interaction function; and unpacking, by the interaction function, first interaction data originating from the service client, from the first interaction container.

11. The method of claim 10, wherein the first interaction data relates to control of service level communication between the service client and a service provider.

12. The method of claim 11, wherein the service level communication is for an adaptive video service.

13. The method of claim 11, wherein the service level communication is over a dedicated bearer.

14. The method of claim 13, wherein the first interaction container comprises information about the dedicated bearer.

15. The method of claim 14, wherein the information about the dedicated bearer comprises at least one of an address of the service provider and an identifier of the dedicated bearer.

16. The method of claim 10, further comprising:

in response to the unpacking of the first interaction data, packing, by the interaction function, second interaction data in a second interaction container;

transferring the second interaction container, comprising the second interaction data, from the interaction function to the control plane function via the API; and sending the second interaction container to the radio device, by means of a radio control plane protocol of the control plane function, over the radio interface.

17. A Radio Access Network (RAN) having an interaction function configured for communication with a service client in a radio device connected to the RAN, the RAN comprising:

processor circuitry; and storage storing instructions which, when executed by said processor circuitry, cause said RAN to perform operations to:

receive a first interaction container, in accordance with a radio control plane protocol, from the radio device over a radio interface;

transfer the first interaction container from a control plane function in the RAN to the interaction function via an application programming interface (API), wherein the first interaction container comprises an identifier for the interaction function, instructing the control plane function to transfer the first interaction container to the interaction function; and unpack, by means of the interaction function, first interaction data originating from the service client, from the first interaction container.

\* \* \* \* \*